(12) United States Patent
Schmeichel et al.

(10) Patent No.: US 12,409,713 B1
(45) Date of Patent: Sep. 9, 2025

(54) ROLL TARP SYSTEM

(71) Applicants: Shayde Daniel Schmeichel, Jamestown, ND (US); Hunter Max Schmeichel, Valley City, ND (US)

(72) Inventors: Shayde Daniel Schmeichel, Jamestown, ND (US); Hunter Max Schmeichel, Valley City, ND (US)

( * ) Notice: Subject to any disclaimer, the term of this patent is extended or adjusted under 35 U.S.C. 154(b) by 0 days.

(21) Appl. No.: 19/046,162

(22) Filed: Feb. 5, 2025

(51) Int. Cl.
*B60J 7/08* (2006.01)

(52) U.S. Cl.
CPC .................................. *B60J 7/085* (2013.01)

(58) Field of Classification Search
CPC ... B60J 7/085; B60J 7/061; B60J 7/062; B60J 7/064; B60J 7/065; B60J 7/068; B60J 7/10; B60J 7/102; B60J 7/104; B60J 7/12; B60J 11/02; B60P 7/02; B60P 7/04
USPC ... 296/98, 100.01, 100.1, 100.11–18, 100.08
See application file for complete search history.

(56) References Cited

U.S. PATENT DOCUMENTS

| | | | | |
|---|---|---|---|---|
| 4,659,134 A * | 4/1987 | Johnson | ................... | B60J 7/085 242/379.2 |
| 4,834,445 A * | 5/1989 | Odegaard | ................ | B60J 7/085 160/245 |
| 5,944,374 A * | 8/1999 | Searfoss | ................... | B60J 7/085 296/98 |
| 6,237,985 B1 * | 5/2001 | O'Brian | ................... | B60J 7/085 160/23.1 |
| 7,726,720 B2 * | 6/2010 | Searfoss | ................... | B60J 7/085 296/100.01 |
| 8,177,284 B1 * | 5/2012 | Royer | ..................... | B60J 5/067 296/100.16 |
| 9,283,832 B2 * | 3/2016 | Knight | ..................... | B60P 7/04 |
| 10,696,145 B2 * | 6/2020 | Hunter | ................... | B61D 39/00 |
| 11,833,956 B2 * | 12/2023 | Reeder | ..................... | B60P 7/04 |

FOREIGN PATENT DOCUMENTS

KR    2023031682 A  *  3/2023

* cited by examiner

*Primary Examiner* — Amy R Weisberg
*Assistant Examiner* — Veronica M Condo
(74) *Attorney, Agent, or Firm* — Fargo Patent & Business Law; Thomas Kading

(57) ABSTRACT

An arm assembly for a roll tarp system includes a first arm which defines a first arm axis; a first arm extension attached to the first arm, the first arm extension defines a first arm extension axis, the first arm extension axis defines an angle with respect to the first arm extension axis between 10 to 95 degrees, the first arm extension comprises a first pivot aperture; a second arm which defines a second arm axis; a second arm extension attached to the second arm, the second arm extension defines a second arm extension axis, the second arm extension axis defines an angle with respect to the second arm extension axis between 10 to 95 degrees, the second arm extension comprises a second pivot aperture; a pivot through the first pivot aperture and the second pivot aperture; and a torsion spring mounted about the pivot to extend into the first arm and the second arm to bias the first arm and the second arm away from one another.

19 Claims, 9 Drawing Sheets

ROLL TARP SYSTEM

CROSS REFERENCE TO RELATED APPLICATION[S]

None

BACKGROUND

The present disclosure relates to roll tarps for trailers and vehicles, and more specifically to an arm system therefor.

Roll tarp systems protect cargo within a container from the elements. A roll tarp may include an elongated roller for rolling and unrolling the tarp attached to one longitudinal side of a container, and an actuator attached to the arm and the elongated roller for rolling and unrolling the tarp between a closed and open position. Although effective, the roll tarp may catch or be blocked by heaping loads that are piled above the sides of the container.

This background section is intended to introduce the reader to various aspects of art that may be related to various aspects of the present disclosure, which are described and/or claimed below. This discussion is believed to assist the reader with background information to facilitate a better understanding of the various aspects of the present disclosure. Accordingly, it should be understood that these statements are to be read in this light, and not as admissions of prior art.

SUMMARY

An arm assembly for a roll tarp system according to one disclosed non-limiting embodiment of the present disclosure includes a first arm which defines a first arm axis; a first arm extension attached to the first arm, the first arm extension defines a first arm extension axis, the first arm extension axis defines an angle with respect to the first arm extension axis between 10 to 95 degrees, the first arm extension comprises a first pivot aperture; a second arm which defines a second arm axis; a second arm extension attached to the second arm, the second arm extension defines a second arm extension axis, the second arm extension axis defines an angle with respect to the second arm extension axis between 10 to 95 degrees, the second arm extension comprises a second pivot aperture; a pivot through the first pivot aperture and the second pivot aperture; and a torsion spring mounted about the pivot to extend into the first arm and the second arm to bias the first arm and the second arm away from one another.

A further embodiment of any of the foregoing embodiments of the present disclosure includes that the angle with respect to the first arm extension axis is between 10 to 30 degrees and wherein the angle with respect to the second arm extension axis is between 10 to 30 degrees.

A further embodiment of any of the foregoing embodiments of the present disclosure includes that the first arm extension fits at least partially within the second arm extension.

A further embodiment of any of the foregoing embodiments of the present disclosure includes that the first arm extension and the second arm extension each comprise two ears.

A further embodiment of any of the foregoing embodiments of the present disclosure includes that the first pivot aperture and the second pivot aperture are coaxial and within an intersection of the first arm axis and the second arm axis.

A further embodiment of any of the foregoing embodiments of the present disclosure includes a first cuboid bushing mounted to a first leg of the torsion spring to fit within the first arm.

A further embodiment of any of the foregoing embodiments of the present disclosure includes a second cuboid bushing mounted to a second leg of the torsion spring to fit within the second arm.

A further embodiment of any of the foregoing embodiments of the present disclosure includes a tubular bushing mounted within a coil of the torsion spring to receive the pivot therethrough, the tubular bushing, the first cuboid bushing and the second cuboid bushing formed of a non-metallic material.

A further embodiment of any of the foregoing embodiments of the present disclosure includes that the torsion spring at least partially counterbalances a weight of the second arm and a roll tarp attached thereto.

A further embodiment of any of the foregoing embodiments of the present disclosure includes that the first arm comprises a mount assembly for pivotable attachment to a container about a container pivot along a longitudinal axis of the container.

A further embodiment of any of the foregoing embodiments of the present disclosure includes that a first arm length between the pivot and the container pivot is at least one-half a width of the container.

A further embodiment of any of the foregoing embodiments of the present disclosure includes an aft arm plate removably fastened to the second arm to receive a roll tarp axle tube therethrough.

A further embodiment of any of the foregoing embodiments of the present disclosure includes a first and a second collar assembly attachable to the roll tarp axle tube to sandwich the aft arm plate therebetween.

A further embodiment of any of the foregoing embodiments of the present disclosure includes that the first and the second collar assembly comprise a split bushing and a clamp.

A further embodiment of any of the foregoing embodiments of the present disclosure includes a split bushing assembly fastened to the aft arm plate about a tarp tube aperture, the split bushing assembly comprises a first portion and a second portion each with a multiple of fastener apertures to receive fasteners adjacent to a semi-circular tarp tube aperture.

A further embodiment of any of the foregoing embodiments of the present disclosure includes a guide plate bracket attached to the second arm to receive a roll tarp axle tube therethrough, the guide plate bracket arranged to mount a motor drive to drive a roll tarp axle tube, the motor drive mounted adjacent to a distal end of the roll tarp axle tube.

A further embodiment of any of the foregoing embodiments of the present disclosure includes a first guide plate bushing and a second guide plate bushing attachable to the guide plate bracket transverse thereto, the first guide plate bushing and the second guide plate bushing form a split tarp tube aperture that receives the roll tarp axle tube therethrough.

A further embodiment of any of the foregoing embodiments of the present disclosure includes a first fastener that attaches the guide plate bracket to the first guide plate bushing and the second guide plate bushing, and a second fastener that attaches the guide plate bracket to the first guide plate bushing and the second guide plate bushing, the first fastener parallel to the second fastener and transverse to the roll tarp axle tube.

A further embodiment of any of the foregoing embodiments of the present disclosure includes a collar assembly attachable to the roll tarp axle tube to retain the guide plate bracket, wherein the collar assembly comprises a split bushing and a clamp that surrounds the split bushing.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
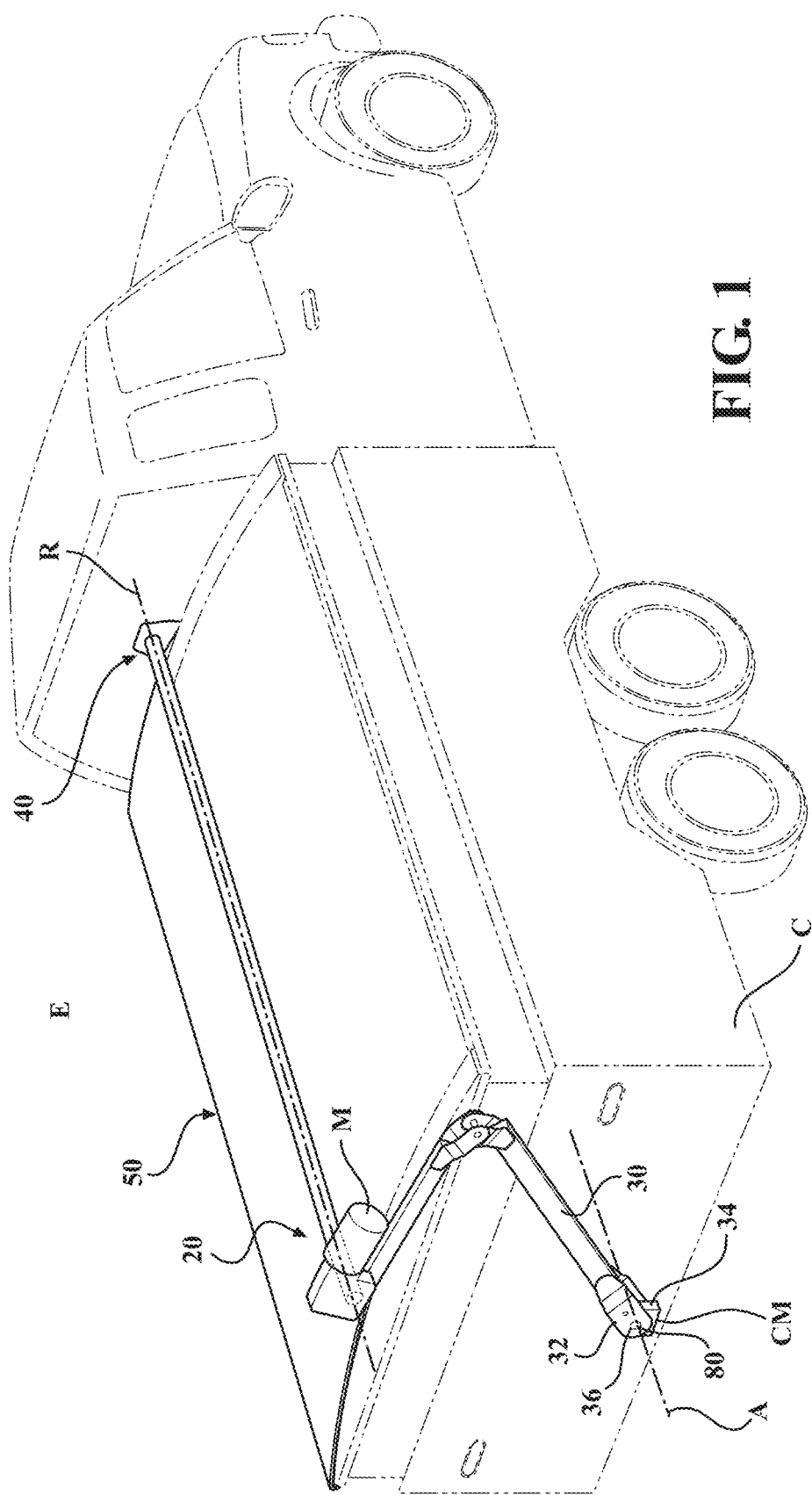
FIG. 1 is a schematic perspective view of a roll tarp system for a container according to one disclosed non-limiting embodiment.

FIG. 1 schematically illustrates a roll tarp system 20 that may be used to tarp a container C such as trailer, truck, etc. The container C may oftentimes be filled with a heaping load (e.g. grain, gravel, etc.) that extends above an upper edge E of the container C which the roll tarp system 20 effectively covers. The roll tarp system 20 pivots about a longitudinal axis A along the container C to roll or unroll a tarp about an axis R to cover or uncover the container C.

The roll tarp system 20 generally includes an aft arm assembly 30, a forward arm assembly 40, a roller assembly 50 between the arms, and a motor drive M. The aft arm assembly 30 and the forward arm assembly 40 are pivotally mounted to a container C such as trailers, truck boxes, etc., about a longitudinal axis A. The roller assembly 50 extends along a roller axis R to laterally cover or uncover an opening of the container C with a tarp 52 rolled or unrolled from the roller assembly 50 over the heaping load in the container C. The tarp 52 may be attached to the container C along one longitudinal side via various fastener structures.

Figure 2:
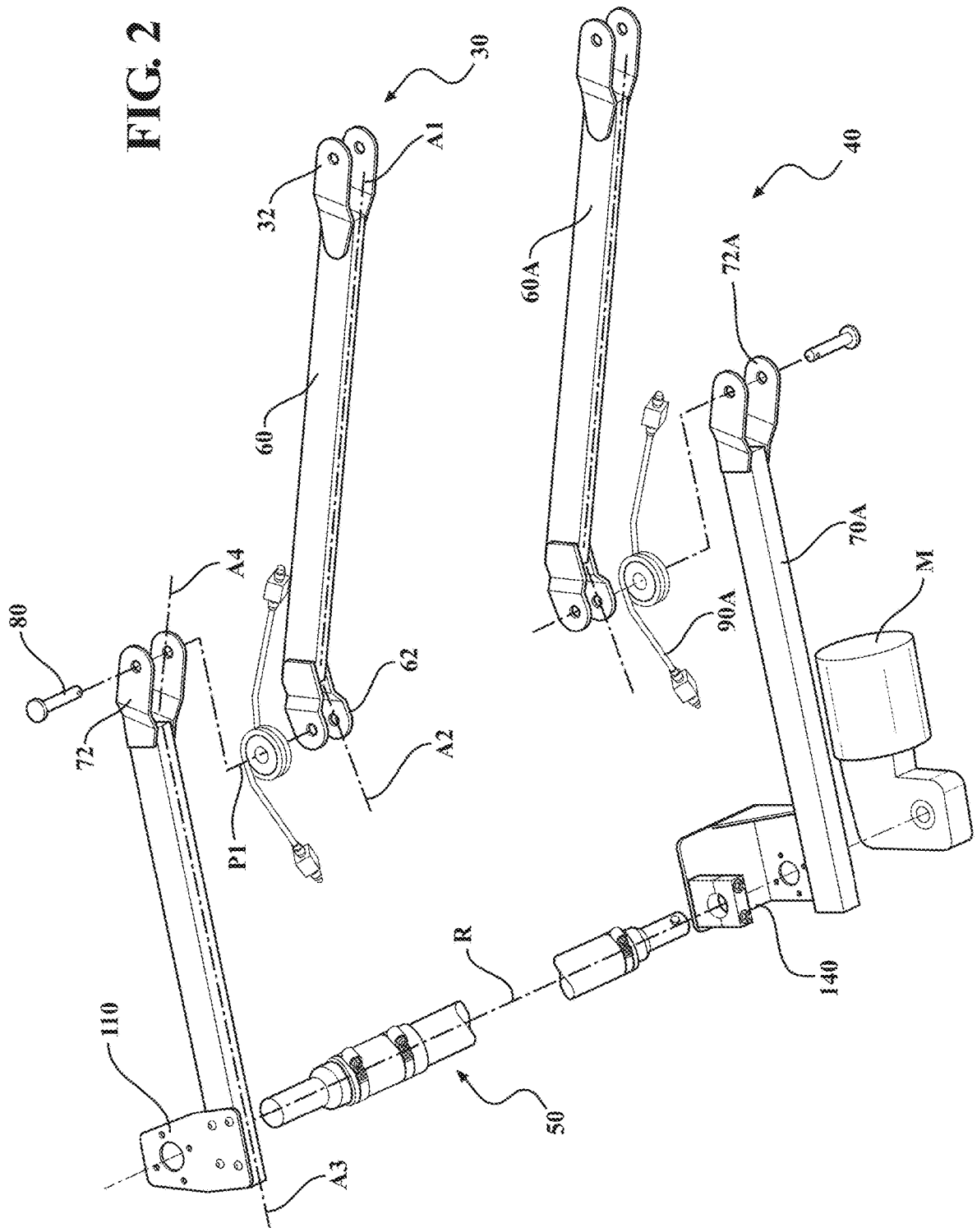
FIG. 2 is an exploded view of the roll tarp system.

With reference also to FIG. 2, the aft arm assembly 30 will be described in detail as the aft arm assembly 30 is generally equivalent to the forward arm assembly 40 which supports the motor drive M to power the roller assembly 50. The aft arm assembly 30 includes an aft first arm 60 which defines an aft first arm axis A1 and an aft first arm extension 62 that defines an aft first arm extension axis A2, and an aft second arm 70 which defines an aft second arm axis A3 and an aft second arm extension 72 that defines an aft second arm extension axis A4.

Figure 3:
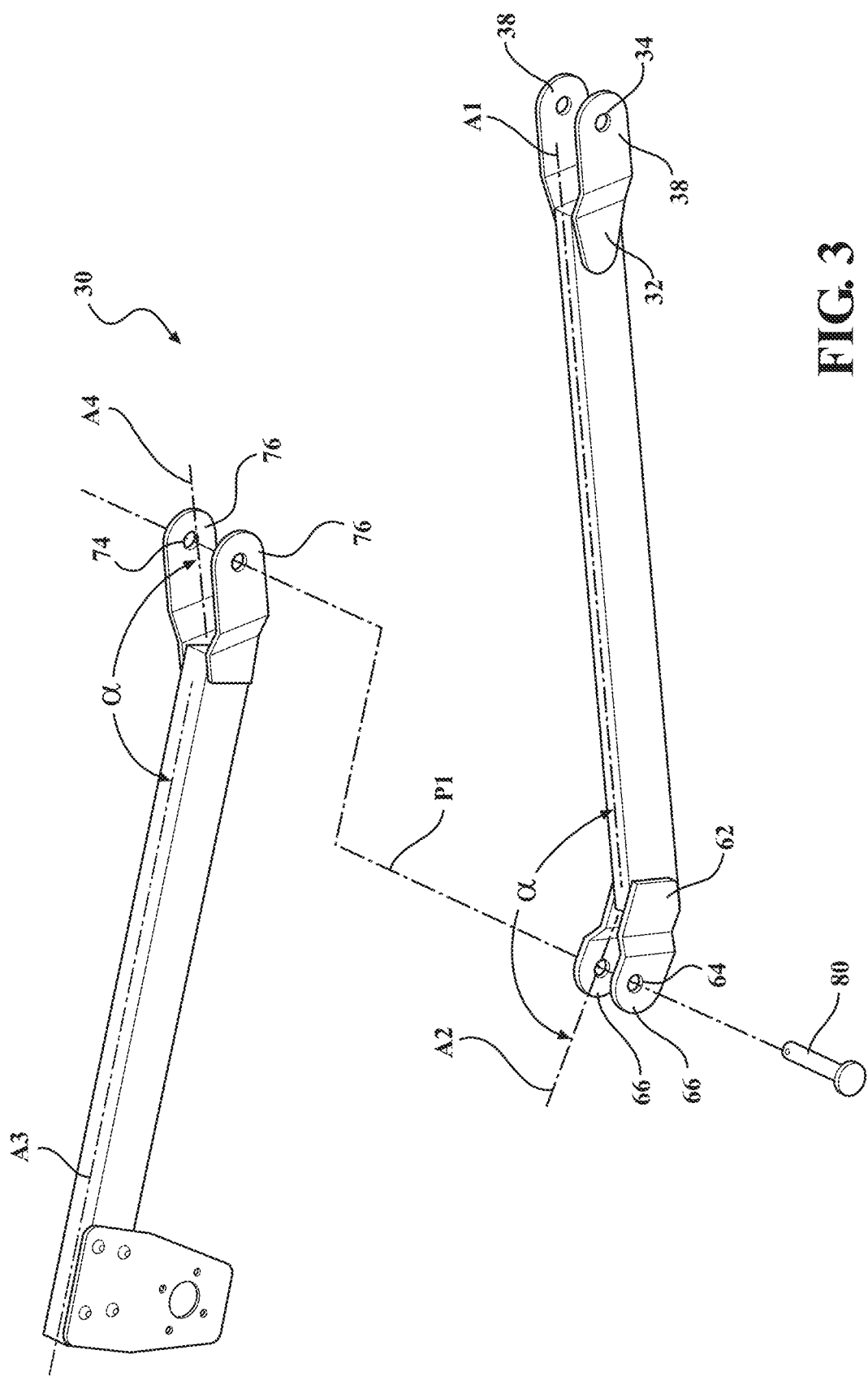
FIG. 3 is an exploded view of an arm assembly of the roll tarp system.

With reference also to FIG. 3, the aft arm assembly 30 includes an aperture 32 in a container mount 34 attached to the first arm 60. The container mount 34 is attached to a mount CM on the container C about the longitudinal axis A via a container pivot 36 such as a pin, fastener, bolt, etc., though the aperture 32. The container mount 34 may be formed as ears 38 welded to the aft first arm 60 along the first arm axis A1.

The first arm axis A1 defines an angle a1 with respect to the first arm extension axis A2 between, for example, 10 to 95 degrees. The first arm extension 62 defines a first pivot aperture 64.

The second arm axis A3 defines an angle a2 with respect to the second arm extension axis A3 between, for example, 10 to 95 degrees and more specifically between 10 to 30 degrees. The second arm extension 72 defines a second pivot aperture 74.

In one embodiment, the aft first arm 60 and the aft second arm 70 may be rectilinear in cross-section and manufactured of a tubular steel material. The first arm extension 62 may be formed as ears 66 that fits at least partially within the second arm extension 72 which may be formed as ears 76. The ears 66, 76 may be formed as plates that are welded to the respective arms.

A pivot 80 such as a pin, fastener, bolt, etc., is secured through the first pivot aperture 64 and the second pivot aperture 74 to support a torsion spring 90 about a pivot axis P1. The torsion spring 90 is mounted about the pivot 80 to extend into the aft first arm 60 and the aft second arm 70 to bias the aft first arm 60 and the aft second arm 70 away from one another to counterbalance a weight of the aft second arm 70 and the roll tarp assembly 50 attached thereto.

Figure 4:
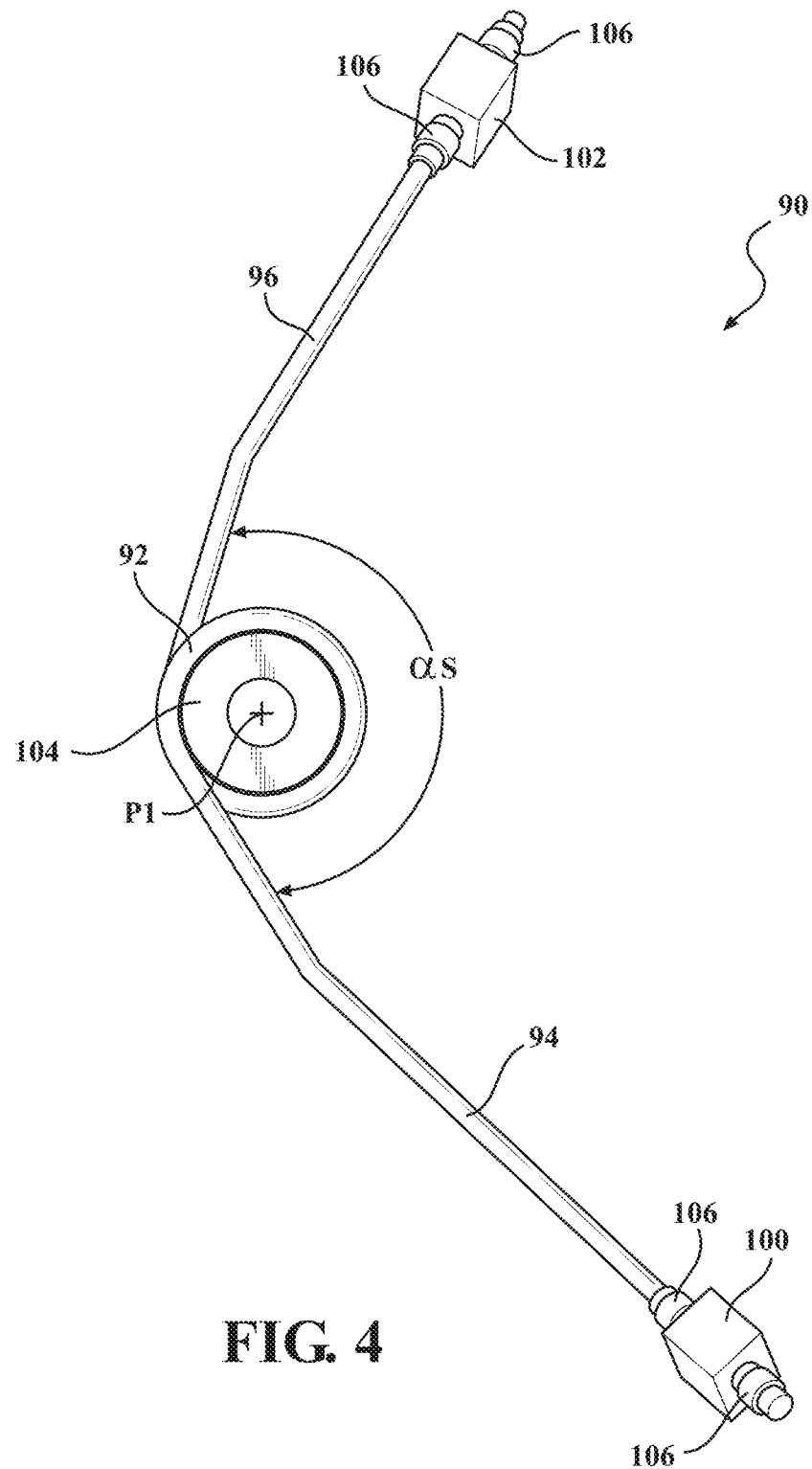
FIG. 4 is a perspective view of a torsion spring for the arm assembly of the roll tarp system.

With reference also to FIG. 4, in one embodiment, the torsion spring 90 generally includes a coil 92 with a first leg 94 and a second leg 96 which extends therefrom. The first leg 94 and the second leg 96 are offset with respect to the coil 92 such that the first leg 94 and the second leg 96 are centered with respect thereto. The first leg 94 forms an angle «S with respect to the second leg 94 about the pivot axis P1. In one embodiment, the first leg 94 forms an obtuse angle aS with respect to the second leg 96 of between, for example, 90 to 130 degrees and more specifically about 100 degrees.

A first cuboid bushing 100 is mounted to the first leg 94 of the torsion spring 90 to fit within the aft first arm 60 and a second cuboid bushing 102 is mounted to the second leg 96 of the torsion spring 90 to fit within the aft second arm 70. The bushings 100, 102 may be retained upon the respective legs via clamps 106, stops, etc.

A tubular bushing 104 is mounted within the coil 92 of the torsion spring 90 to receive the pivot 80 therethrough. The bushings 100, 102, 104 may be manufactured of a non-metallic material to facilitate locating and centering of the torsion spring 90 between the arms 60, 70 about the about the pivot axis P1. The bias force applied by the torsion spring 90 facilitates the extension of the arms 60, 70 which, in effect, facilitates the "floating" of the roller assembly 50 over the heaping load.

Figure 5:
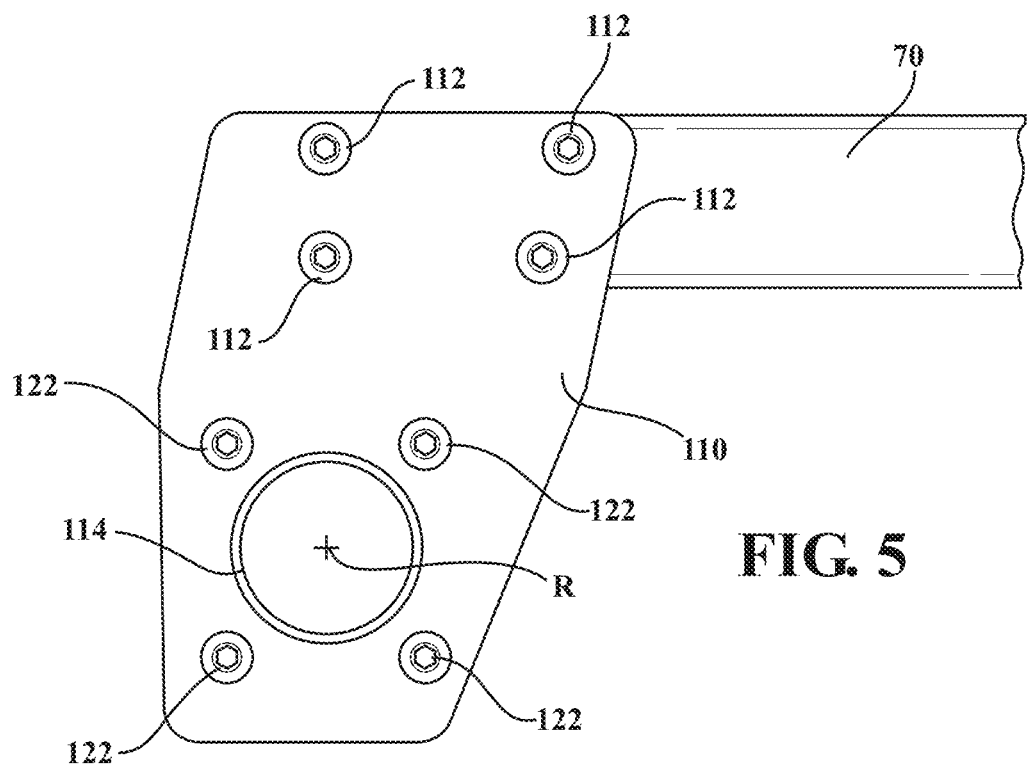
FIG. 5 is an expanded side view of an aft arm plate for an aft arm assembly of the roll tarp system.
Figure 6:
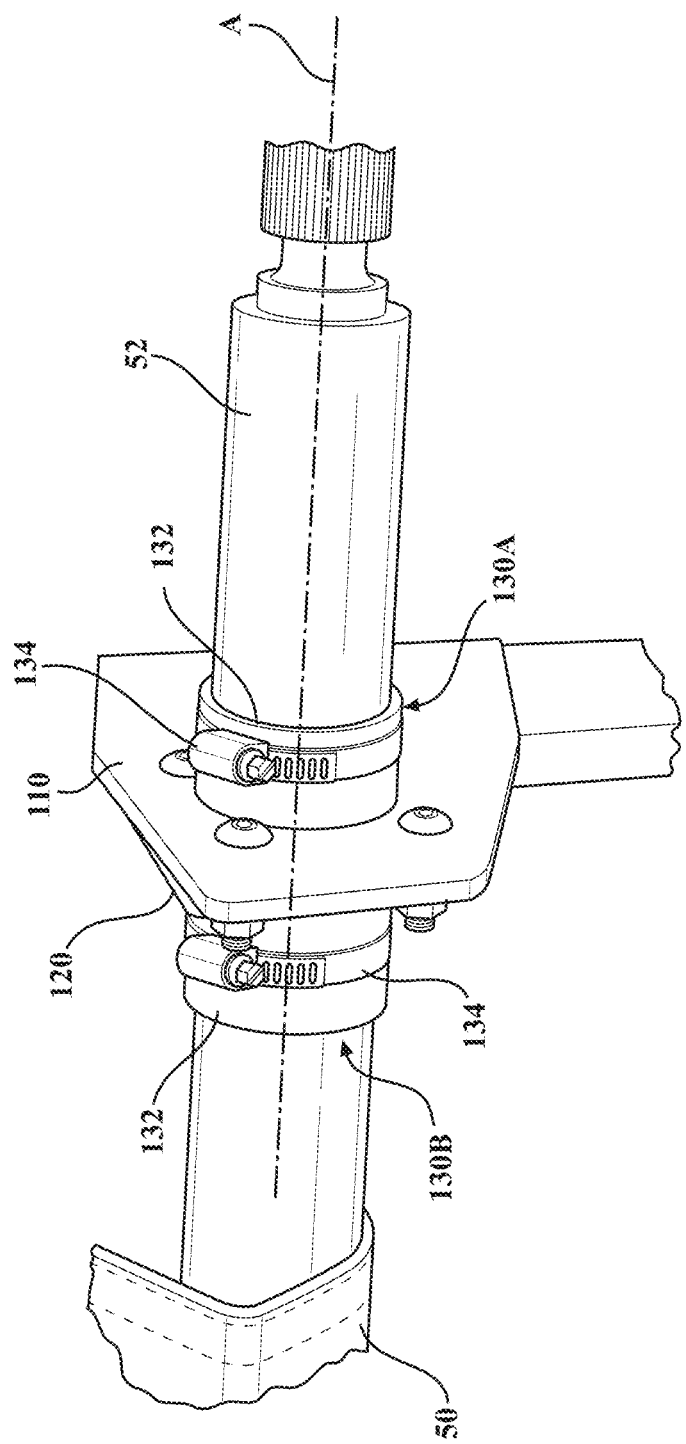
FIG. 6 is a perspective view of the aft arm assembly to rotationally support the roller assembly.

With reference also to FIG. 5, an aft arm plate 110 is removably fastened to the aft second arm 70 opposite the second arm extension 72 via a multiple of fasteners 112 such as bolts. The aft arm plate 110 includes a tarp tube aperture 114 that receives a roll tarp axle tube 52 of the roller assembly 50 therethrough (FIG. 6). The tarp tube aperture 114 may be offset from the second arm axis A3 and on an opposite side with respect to the second pivot aperture 74 in the second arm extension 72.

Figure 7:
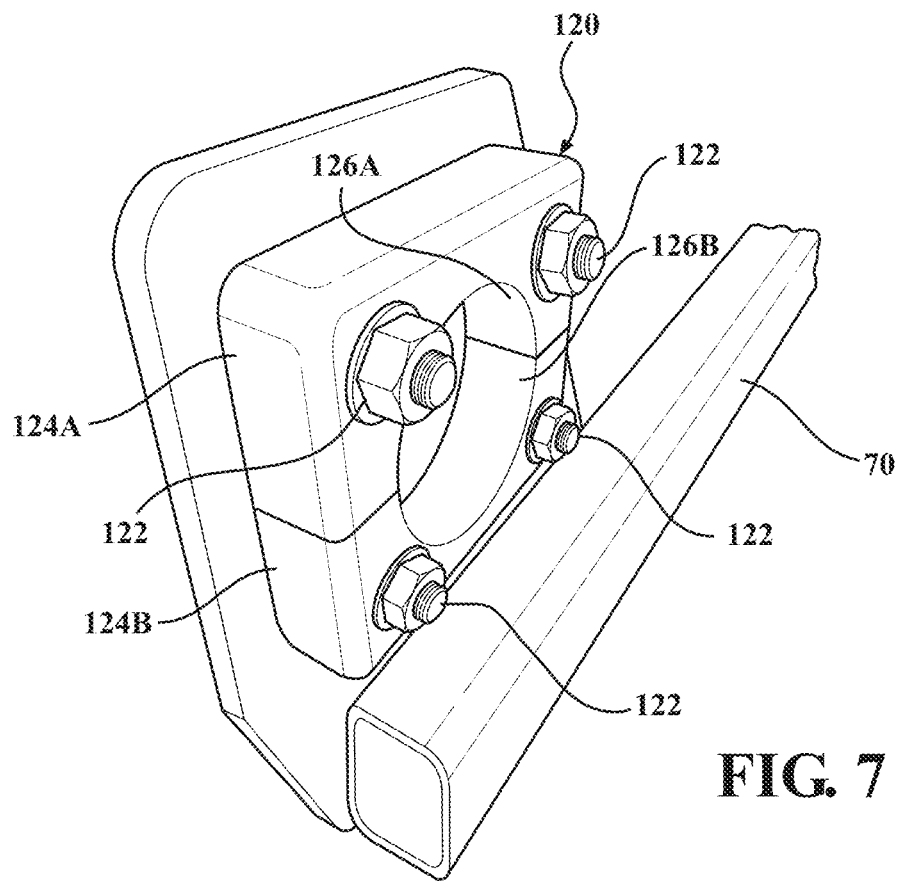
FIG. 7 is a perspective view of a split bushing assembly for the aft arm plate.

With reference also to FIG. 6, a split bushing assembly 120 may be fastened to the aft arm plate 110 about the tarp tube aperture 114 via a multiple of fasteners 122 such as bolts. The split bushing assembly 120 includes a first portion 124A and a second portion 124B each with two fastener apertures 126A, 126B to receive the fasteners 122 parallel to a semi-circular tarp tube aperture 114A, 114B which collectively form the tarp tube aperture 114 about the roller axis R (FIG. 7). The split bushing assembly 120 may be manufactured of a non-metallic material to facilitate rotational support of the roll tarp axle tube 52. By being a separable assembly, the split bushing assembly 120 facilitates replacement of the roll tarp assembly 50.

A first collar assembly 130A and a second collar assembly 130B is mounted to the roll tarp axle tube 52 to sandwich the aft arm plate 110 and the split bushing assembly 120 therebetween to facilitate replacement of the roll tarp assembly 50. The first collar assembly 130A and the second collar assembly 130B each include a split cylindrical bushing 132 and a clamp 134. The clamp 134 encircles and compresses the split cylindrical bushing 132 to sandwich the aft arm plate 110 and rotationally retain the roll tarp axle tube 52 within the tarp tube aperture 114.

Figure 8:
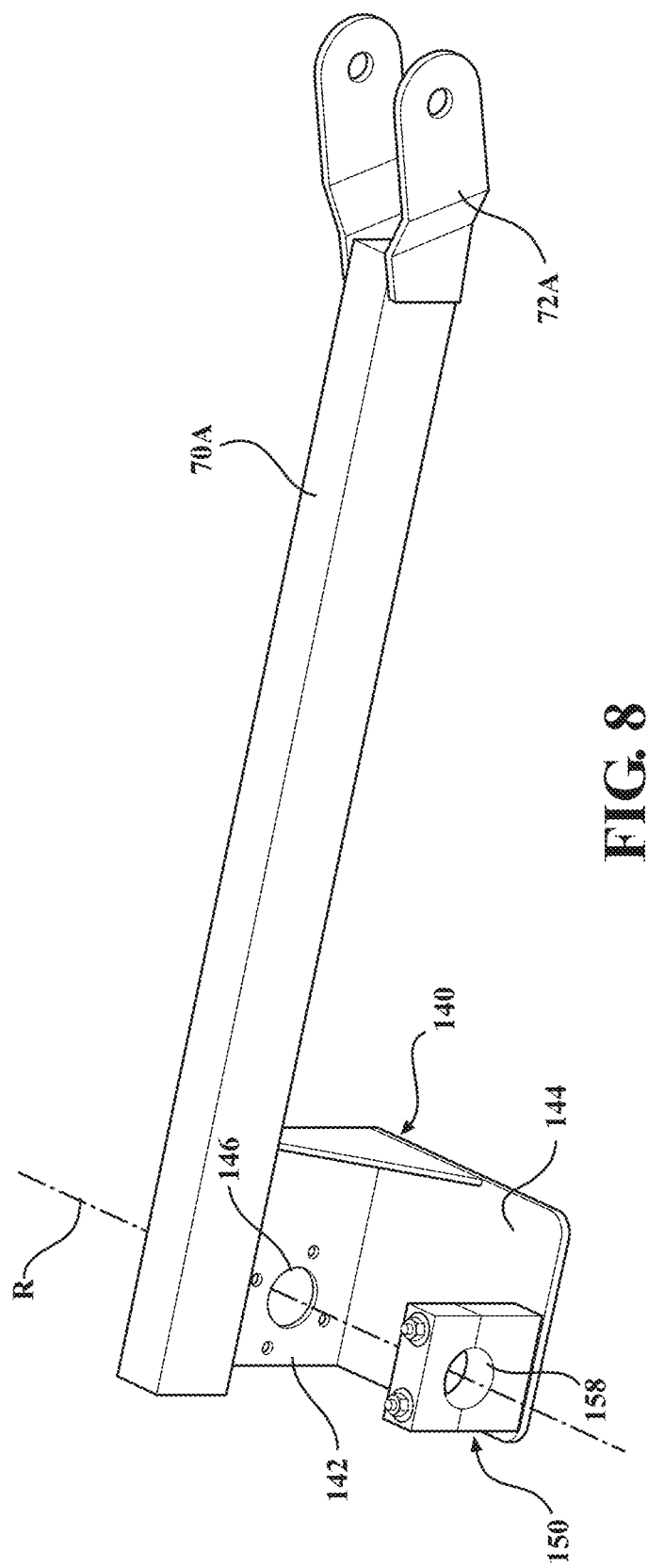
FIG. 8 is a perspective view of a forward aft arm assembly.

With reference also to FIG. 8, the forward arm assembly 40 is generally equivalent to the aft arm assembly 30 but supports the motor drive M to power the roller assembly 50. In other words, the geometry, torsion spring, interface, etc., of the forward arm assembly 40 is generally equivalent to the aft arm assembly 30 and need not be again described in detail.

A guide plate bracket 140 is attached to a forward second arm 70A opposite a forward second arm extension 72A. The guide plate bracket 140 may be generally "L" shaped with a first guide plate bracket portion 142 welded to the forward second arm 70A and a second guide plate bracket portion 144 transverse thereto. The first guide plate bracket portion 142 includes drive apertures 146 to mount the motor drive M thereto to power the roller assembly 50. The motor drive M is mounted adjacent to a distal end 54 (FIG. 10) of the roll tarp axle tube 52 to engage therewith along a motor axis of rotation Mr which is coaxial with the roller axis R.

A drive shaft Ms of the motor drive M may engage the distal end 54 of the roll tarp axle tube 52 via a transverse fastener Mf. The motor drive M may be manually and/or automatically controlled via a control unit mounted to the container C and in communication with the motor drive M.

Figure 9:
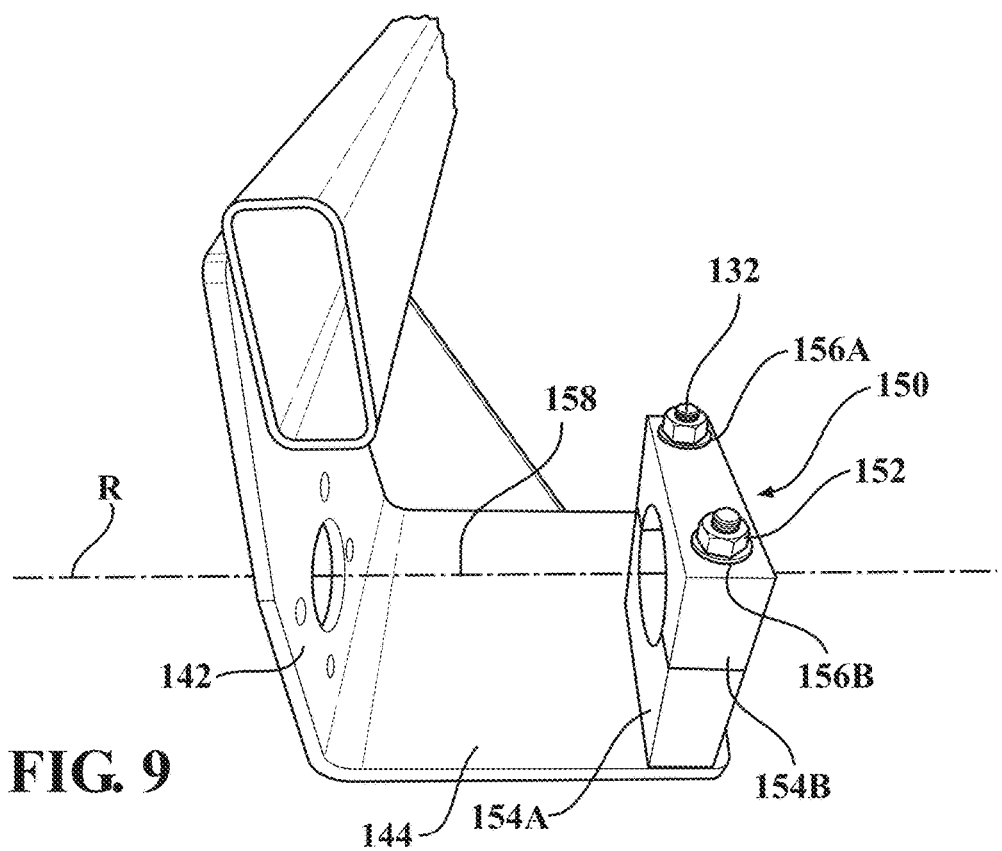
FIG. 9 is an expanded end view of a guide plate bushing assembly for a guide plate bracket of the forward arm assembly.
Figure 10:
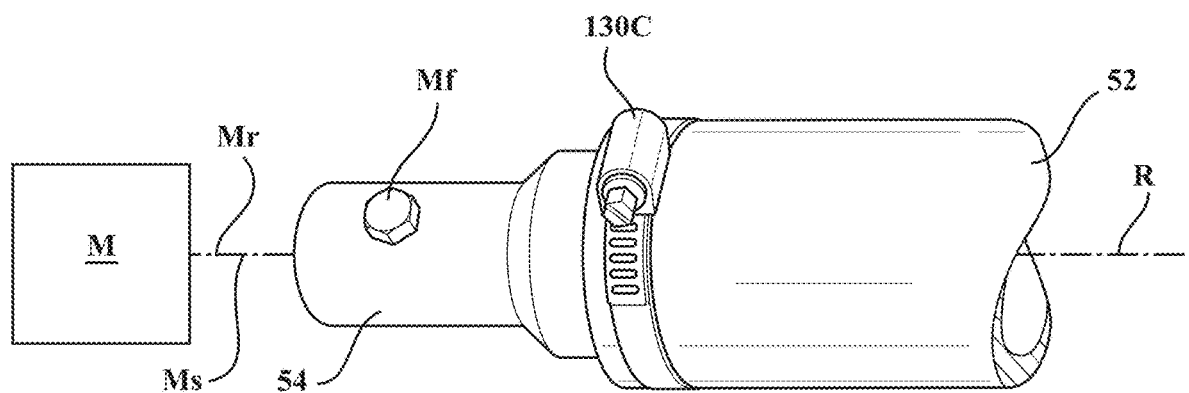
FIG. 10 is a perspective view of the guide plate bushing assembly for the guide plate bracket of the forward arm assembly to support the roll tarp assembly.

With reference also to FIG. 8-10, a split guide plate bushing assembly 150 may be fastened to the second guide plate bracket portion 144 via a multiple of fasteners 152 such as bolts so as to be parallel to the first guide plate bracket portion 142. The split guide plate bushing assembly 150 includes a first portion 154A and a second portion 154B each with two fastener apertures 156A, 156B to receive the fasteners 152 adjacent to, and within a common plane of a split tarp tube aperture 158 along the roller axis R. That is, the split tarp tube aperture 158 is split as semi-circular apertures 158A, 158B within each of the first portion 154A and the second portion 154B, respectively. The split guide plate bushing assembly 150 may be manufactured of a non-metallic material to facilitate rotational support of the roll tarp axle tube 52. By being a separable assembly, the split guide plate bushing assembly 150 further facilitates replacement of the roll tarp assembly 50.

A third collar assembly 130C is mounted to the roll tarp axle tube 52 to abut the split guide plate bushing assembly 150 to facilitate replacement of the roll tarp assembly 50. The collar assembly 130C includes a split cylindrical bushing 132C and a clamp 134C. The clamp 134C encircles and compresses the split cylindrical bushing 132C to rotationally retain the roll tarp axle tube 52 within the split tarp tube aperture 158. The third collar assembly 130C is located between the first guide plate bracket portion 142 and the split guide plate bushing assembly 150.

Figure 11:
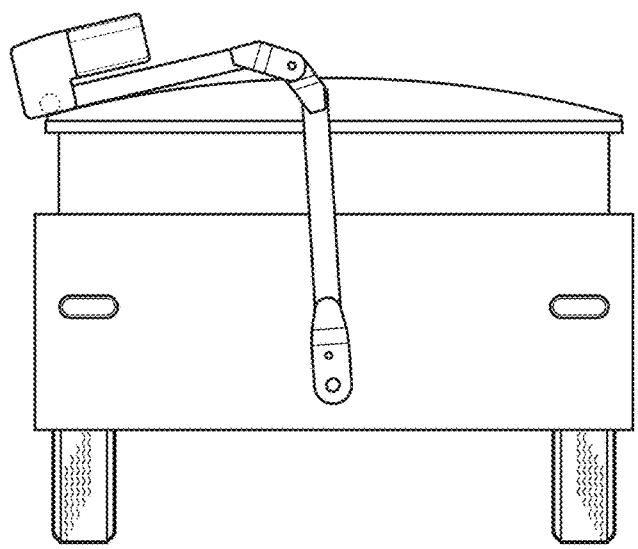
FIG. 11 is a perspective end view of the roll tarp system in an unrolled position.
Figure 12:
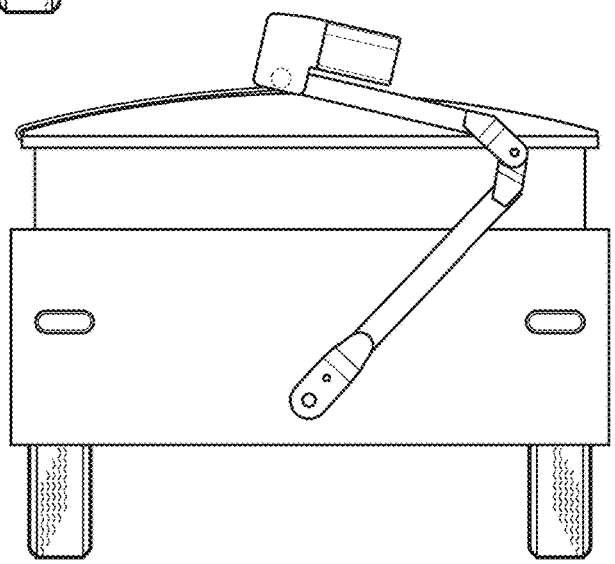
FIG. 12 is a perspective end view of the roll tarp system in an intermediate position.
Figure 13:
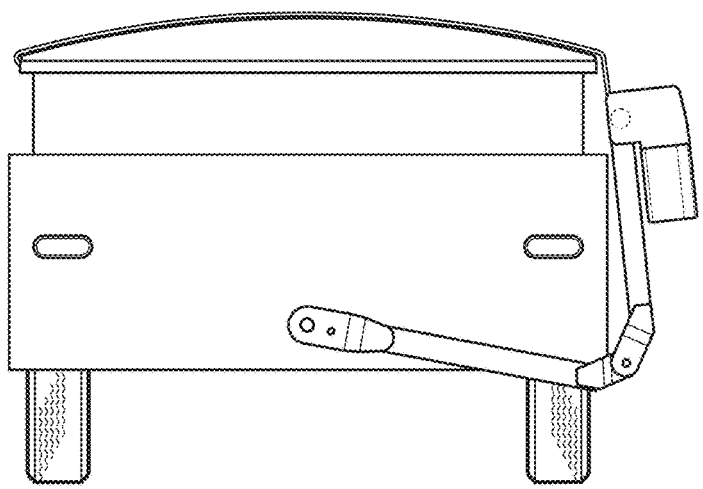
FIG. 13 is a perspective end view of the roll tarp system in a rolled position.

The roll tarp system 20 readily facilitates the "floating" of the roller assembly 50 over the heaping loads that are piled above the sides of the container (FIGS. 11-13) and facilities disassembly of the roller assembly 50 from the aft arm assembly 30 and the forward arm assembly 40 for replacement of the tarp.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. An arm assembly for a roll tarp system, comprising:
  a first arm which defines a first arm axis;
  a first arm extension attached to the first arm, the first arm extension defines a first arm extension axis, the first arm extension axis defines a first angle with respect to the first arm axis between 10 to 95 degrees, the first arm extension comprises a first pivot aperture;
  a second arm which defines a second arm axis;
  a second arm extension attached to the second arm, the second arm extension defines a second arm extension axis, the second arm extension axis defines second angle with respect to the second arm axis between 10 to 95 degrees, the second arm extension comprises a second pivot aperture;
  a pivot through the first pivot aperture and the second pivot aperture; and
  a torsion spring mounted about the pivot to extend into the first arm and the second arm to bias the first arm and the second arm away from one another.

2. The arm assembly as recited in claim 1, wherein the first angle is between 10 to 30 degrees and wherein the second angle is between 10 to 30 degrees.

3. The arm assembly as recited in claim 1, wherein the first arm extension fits at least partially within the second arm extension.

4. The arm assembly as recited in claim 3, wherein the first arm extension and the second arm extension each comprise two ears.

5. The arm assembly as recited in claim 1, wherein the first pivot aperture and the second pivot aperture are coaxial and within an intersection of the first arm axis extension and the second arm axis extension.

6. The arm assembly as recited in claim 1, further comprising a first cuboid bushing mounted to a first leg of the torsion spring to fit within the first arm.

7. The arm assembly as recited in claim 6, further comprising a second cuboid bushing mounted to a second leg of the torsion spring to fit within the second arm.

8. The arm assembly as recited in claim 7, further comprising a tubular bushing mounted within a coil of the torsion spring to receive the pivot therethrough, the tubular bushing, the first cuboid bushing and the second cuboid bushing formed of a non-metallic material.

9. The arm assembly as recited in claim 1, wherein the torsion spring at least partially counterbalances a weight of the second arm and a roll tarp attached thereto.

10. The arm assembly as recited in claim 1, wherein the first arm comprises a mount assembly for pivotable attachment to a container about a container pivot along a longitudinal axis of the container.

11. The arm assembly as recited in claim 10, wherein a first arm length between the pivot and the container pivot is at least one-half a width of the container.

12. The arm assembly as recited in claim 1, further comprising an aft arm plate removably fastened to the second arm to receive a roll tarp axle tube therethrough.

13. The arm assembly as recited in claim 12, further comprising a first and a second collar assembly attachable to the roll tarp axle tube to sandwich the aft arm plate therebetween.

14. The arm assembly as recited in claim 13, wherein the first and the second collar assembly comprise a split bushing and a clamp.

15. The arm assembly as recited in claim 14, further comprising a split bushing assembly fastened to the aft arm plate about a tarp tube aperture, the split bushing assembly comprises a first portion and a second portion each with a multiple of fastener apertures to receive fasteners adjacent to a semi-circular tarp tube aperture.

16. The arm assembly as recited in claim 1, further comprising a guide plate bracket attached to the second arm to receive a roll tarp axle tube therethrough, the guide plate bracket arranged to mount a motor drive to drive a roll tarp axle tube, the motor drive mounted adjacent to a distal end of the roll tarp axle tube.

17. The arm assembly as recited in claim 16, further comprising a first guide plate bushing and a second guide plate bushing attachable to the guide plate bracket transverse thereto, the first guide plate bushing and the second guide plate bushing forms a split tarp tube aperture that receives the roll tarp axle tube therethrough.

18. The arm assembly as recited in claim 17, further comprising a first fastener that attaches the guide plate bracket to the first guide plate bushing and the second guide plate bushing, and a second fastener that attaches the guide plate bracket to the first guide plate bushing and the second guide plate bushing, the first fastener parallel to the second fastener and transverse to the roll tarp axle tube.

19. The arm assembly as recited in claim 18, further comprising a collar assembly attachable to the roll tarp axle tube to retain the guide plate bracket, wherein the collar assembly comprises a split bushing and a clamp that surrounds the split bushing.

\* \* \* \* \*